No. 773,895. PATENTED NOV. 1, 1904.
E. B. W. REICHEL.
RUNNING GEAR FOR MOTOR VEHICLES.
APPLICATION FILED AUG. 17, 1899.
NO MODEL.
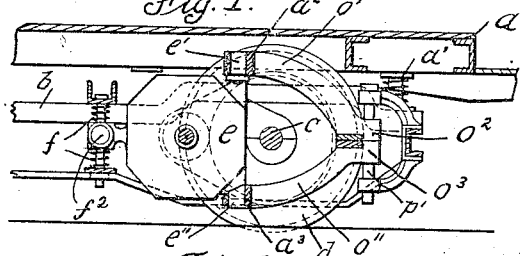
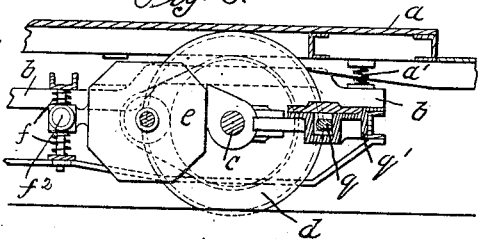
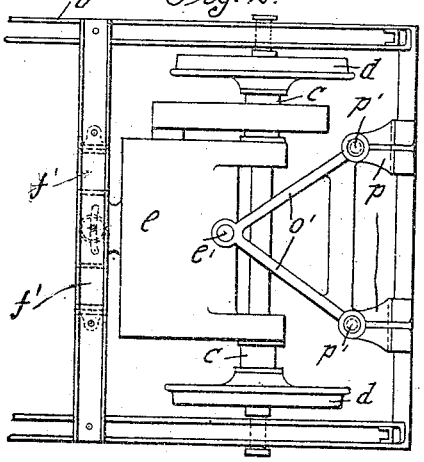
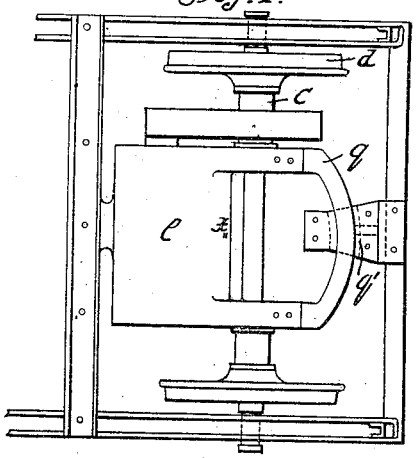
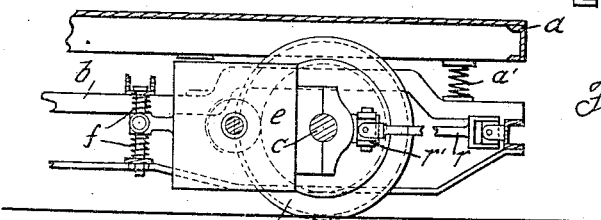
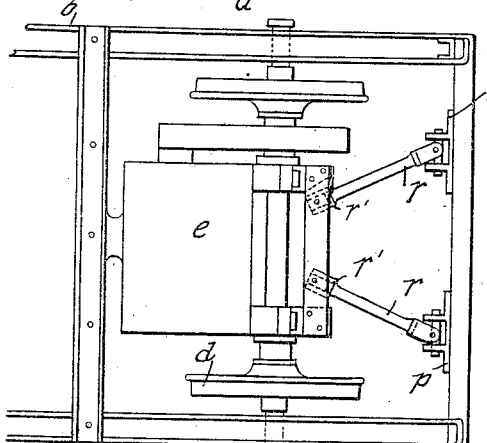
Witnesses:
Inventor:
E. B. W. Reichel,
By Charles A. Brown & Cragg
Attorneys No. 773,895. Patented November 1, 1904.

UNITED STATES PATENT OFFICE.

EMIL BERTHOLD WALTER REICHEL, OF STEGLITZ, GERMANY, ASSIGNOR TO SIEMENS & HALSKE ELECTRIC COMPANY OF AMERICA, OF CHICAGO, ILLINOIS, A CORPORATION OF ILLINOIS.

RUNNING-GEAR FOR MOTOR-VEHICLES.

SPECIFICATION forming part of Letters Patent No. 773,895, dated November 1, 1904.

Application filed August 17, 1899. Serial No. 727,526. (No model.)

*To all whom it may concern:*

Be it known that I, EMIL BERTHOLD WALTER REICHEL, a subject of the German Emperor, residing at Steglitz, near Berlin, Germany, have invented a certain new and useful Improvement in Running-Gear for Motor-Vehicles, (Case No. 220,) of which the following is a full, clear, concise, and exact description, reference being had to the accompanying drawings, forming a part of this specification.

My invention relates to running-gear for motor-vehicles, and more particularly to electric vehicles, and has for its object the provision of an improved running-gear for vehicles of this class.

More particularly, my invention is designed for use in connection with electric vehicles which are adapted for operation upon rails, the driving-motor in this class of vehicles being generally pivotally secured about the driving-axle.

My invention has for its prime object so to mount the motor upon a truck-frame that a circular adjustment of the said motor about said driving-axle may take place at all times irrespective of whether the vehicle is operating upon a straight stretch of track or is rounding curves.

My invention is especially adapted for use in connection with rotatably-mounted axles—such, for instance, as those described in my previous United States Patent No. 613,018, of October 25, 1898, wherein the axles are allowed to adjust themselves to curves in the road-bed. The motor is in this instance preferably rotatably secured about said axle at one end and mounted between springs at the other, so that a yielding suspension therefor is obtained.

In the preferred embodiment of my present invention I employ transmission members uniting the motor-frame with the truck, so as to permit both a horizontal swinging movement of the axle and a vertical movement thereof. In this way the axle is permitted to swing horizontally, to accommodate itself to curves, and also the motor is permitted a slight extent of vertical swinging movement about the axle, so as to prevent roughness in stopping and starting.

I will explain my invention more in detail by reference to the accompanying drawings, illustrating several embodiments thereof, in which—

Figure 1 is a side elevation of my improved running-gear, partly in section. Fig. 2 is a top view thereof. Fig. 3 is a modification of the invention as shown in Fig. 1. Fig. 4 is a top view thereof. Fig. 5 is a side view of another modification, and Fig. 6 is a top view thereof.

Like characters of reference indicate like parts throughout the different figures.

In the drawings I have shown a car-body $a$ mounted by means of springs $a'\ a'$ upon a truck-frame $b$. The truck-frame $b$ is supported by means of axles $c$, rotatably secured thereto, so that the said axles may adjust themselves to curves in the road-bed. Any means for accomplishing this result may be employed. Thus, for instance, as illustrated in my previous patent, No. 613,018, vehicle-wheels $d\ d$ are mounted upon the axles $c$. The casing $e$ of the motor is preferably pivotally secured to the axle $c$ at one end, while the remaining end of the motor is yieldingly suspended by means of springs $f\ f$, secured to the cross-pieces of the truck-frame $b$.

In the embodiment of the invention shown in Figs. 1 and 2 I provide two pivots $e'\ e''$ upon the motor-frame $e$, which pivots are adapted to transmit the motion of the axle and motor to the truck-frame. I accomplish this by means of transmission members $o'\ o''$, each provided with a bearing, respectively, $o^2\ o^3$ for engaging the pivots $e'\ e''$. Each of the transmission members $o'\ o''$ is preferably V-shaped, a web preferably uniting the two projecting members, bearings $o^2\ o^2$ being preferably provided at the end of each of the projecting arms of the transmission member $o'$, while bearings $o^3\ o^3$ are preferably provided at the extremities of both of the projecting arms of the transmission member $o''$. Each pair of bearings $o^2$ $o^3$ are preferably superposed and are mounted upon shafts $p'$ $p'$, sufficient play being allowed between the inner surfaces of the bearings $o^2$ $o^3$ and the shaft $p'$ so that a vertical displacement of the said bearings relative to the said shaft may take place. The shafts $p'$ are preferably secured, by means of brackets $p$ $p$, to a cross-bar of the truck-frame $b$. Lateral springs $f'$ $f'$ are preferably provided to act against the motor-supporting member $f^2$, so that the amount of swing of the motor and axle relative to the truck-frame is limited. It will be seen that the yielding suspension of the motor is at all times maintained irrespective of whether the axle $c$ is perpendicularly placed as regards the truck-frame or whether the same is angularly displaced thereto. When the vehicle is rounding curves and the axle $c$ is displaced from its perpendicular position relative to the truck-frame $b$, one of the springs $f'$ is compressed, thereby tending to place the axle $c$ again in a central position. While in the displaced position, however, the yielding suspension of the motor is still retained, as the suspension member $f^2$ of the motor is retained between the springs $f$ $f$, a sufficient amount of play being left between the bearings $o^2$ $o^3$ and the shaft $p'$ so the said bearings $o^2$ $o^3$ may move vertically with respect to the shaft $p'$, the motor being thus permitted to swing in a circle about the driving-axle $c$.

In Figs. 3 and 4 I have illustrated a modification in which I employ a sector $q$, rigidly secured to the motor-frame, which is adapted to slide within a guide-frame $q'$, preferably fixedly secured to the truck $b$. A displacement of the axle causes the sector $q$ to move within its guide-bearing $q'$ in the arc of a circle. The motor retains its yielding suspension irrespective of the position of the driving-axle, inasmuch as a slight vertical play is allowed between the sector $q$ and the guide $q'$. I have shown the center of the circle about which the axle and motor revolve in this instance as at $x$.

In Figs. 5 and 6 I employ connecting-rods $r$ $r$ to transmit the motion to the truck-frame $b$, the said connecting-rods $r$ being secured to brackets $p$ $p$ by means of universal joints, the said brackets $p$ being secured to the truck-frame $b$. I prefer to employ double joints $r'$ $r'$ to unite the said connecting-rods $r$ $r$ to the motor-casing $e$.

It will be seen that in the arrangement as herein set forth the yielding suspension of the motor is not sacrificed when the adjustable driving-axle is displaced when rounding curves.

I have herein shown and particularly described the preferred embodiment of my invention; but I do not wish to limit myself to the precise construction, as herein shown and particularly described; but,

Having thus described my invention, what I claim as new, and desire to secure by Letters Patent, is—

1. In an electric motor-vehicle, the combination with a wheel-frame or truck, of means independent of the vehicle-body for connecting the truck and axle, said means being adapted to permit both a horizontal swinging movement and a vertical bodily movement on the part of the axle, substantially as described.

2. In an electric motor-vehicle, the combination with a wheel-frame or truck, of transmitting members for transmitting the motive power to the truck, means for connecting said transmitting members with the axle so as to permit a horizontal swinging movement thereof, and means for connecting the said members to the truck so as to permit a vertical movement of the members and thereby a vertical bodily movement of the axle, substantially as set forth.

3. In an electric motor-vehicle, the combination with a wheel-frame or truck, of transmitting members carried by said wheel-frame independent of the vehicle-body for transmitting motive power to the truck, the said transmitting members affording a pivotal support for the motor-casing, whereby the same and the axle can be swung horizontally, and a loose connection between said members and the truck, whereby the members can be vertically displaced, substantially as described.

4. In an electric motor-vehicle, the combination with a wheel-frame, such as a truck, of transmitting members arranged above and below the motor-casing and pivotally connected therewith, and pins on the motor-truck engaging the opposite ends of the transmitting members, the transmitting members having bearings adapted to permit play upon the said pins, substantially as described.

5. In an electric motor-vehicle, the combination with a wheel-frame or truck, of a wheel-axle, a motor associated with the axle for driving the same, and means carried by the wheel-frame independent of the vehicle-body for connecting the motor-frame with said wheel-frame, said means being adapted to permit both a horizontal swinging movement and a vertical movement on the part of the motor and axle.

6. In an electric motor-vehicle, the combination with a wheel-frame or truck, of a wheel-axle, a motor associated with said axle, and connections independent of the vehicle-body between the wheel-frame and motor-frame, said connections being adapted to permit a vertical movement and also a horizontal swinging movement on the part of the motor and axle.

In witness whereof I hereunto subscribe my name this 25th day of July, A. D. 1899.

EMIL BERTHOLD WALTER REICHEL.

Witnesses:
HENRY HASPER,
WOLDEMAR HAUPT.